Patented Aug. 14, 1928.

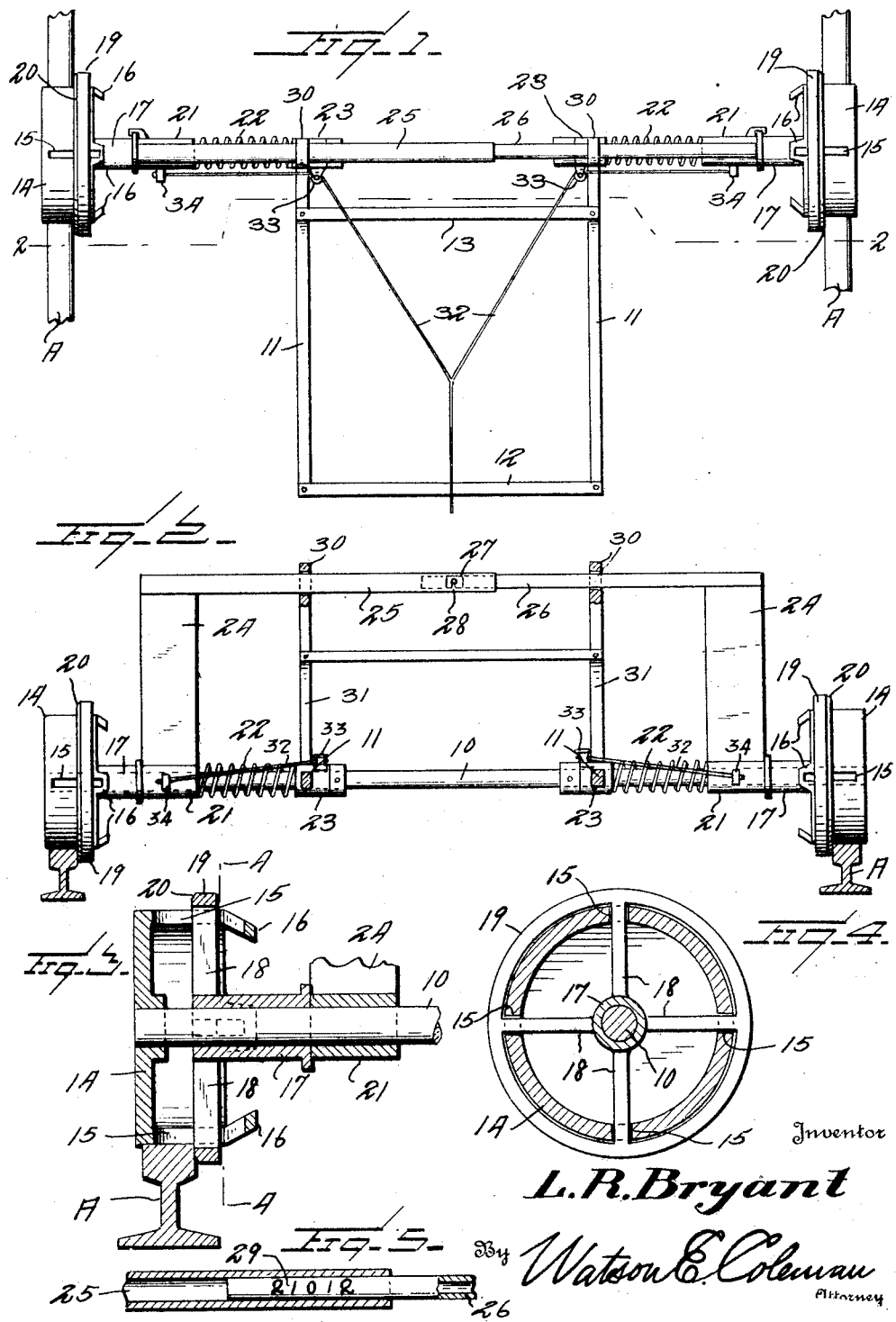

1,681,091

UNITED STATES PATENT OFFICE.

LESLIE RAY BRYANT, OF HATTIESBURG, MISSISSIPPI, ASSIGNOR OF ONE-HALF TO WALTER LISTON BASS, OF HATTIESBURG, MISSISSIPPI.

TRACK-GAUGE INDICATOR.

Application filed January 20, 1927. Serial No. 162,357.

This invention relates to devices adapted to be mounted upon or connected to a wheeled vehicle travelling over a track whereby variations in the gauge of the track may be indicated, and the general object of the invention is to provide a device of this character which may be attached to a hand car, railroad motorcycle, or bicycle, or any vehicle of this character which will indicate variations in the gauge of the rails.

Another object is to provide a device of this character which includes wheels travelling upon the track itself and annular members which are forced against the side faces of the track and controlling certain indicating means, the indicating means preferably consisting of telescopic members, one having an opening and the other having numerals showing through this opening as these members are shifted relative to each other.

Other objects will appear in the course of the following description.

My invention is illustrated in the accompanying drawings wherein:—

Figure 1 is a top plan view of a gauge and indicator constructed in accordance with my invention;

Fig. 2 is a section on the line 2—2 of Figure 1;

Fig. 3 is a vertical sectional view through one of the supporting wheels and the rail engaging member;

Fig. 4 is a section on the line 4—4 of Figure 3;

Fig. 5 is a fragmentary longitudinal sectional view through one of the telescopic members and showing the other partially in section.

Referring to these drawings 10 designates an axle and mounted upon this axle is a frame consisting of the forwardly extending draft bars 11 which are connected by cross bars 12 and 13, both of these cross bars being attached to the draft bars 11 so as to form a rigid frame. The cross bar 12 will be approximately 2' wide. The axle 10 at its extremities carries the wheels 14 which are intended to run upon the rails A and which have relatively wide rim portions. These rim portions which are formed as flanges extending inward from the web of the wheel have slots 15 of any number desired and which are disposed in parallel relation to the axis of the wheel. These slots are closed at their outer ends by the web of the wheel and at their inner ends by a connecting piece 16 preferably formed integrally with the flange or tread of the wheel, and this connecting web 16 being centrally and inwardly bent, as illustrated in Figure 3.

Surrounding the axle adjacent the ends thereof, are the sleeves 17 and these sleeves are adapted to move loosely inward and outward upon the ends of the axle. Each sleeve carries the radiating spokes 18 which extend out through the slots 15 and an annular rim or gauging member 19 is mounted upon the ends of these spokes. The outer corner of each annular gauging member 19 is beveled, as at 20. The sleeves have a length of approximately 6" and the rim has a diameter of approximately 12".

Mounted upon the axle 10 and swiveled to the sleeve 17 are the sleeves 21 which are urged outward against the sleeves 17 by means of the relatively light springs 22 which are coiled around the axle on each side of the frame 11 and bear against the bearings 23 for the axle. Each of these sleeves 21 supports the vertical members 24 and each pair of vertical members supports a cross bar 25. One of these cross bars 25 is tubular while the other cross bar 26 telescopes within the tubular cross bar 25. These cross bars 25 and 26 constitute gauge indicating members and the member 25 has an opening 27 with an index mark or point 28 while the member 26 carries a series of numerals or graduations constituting a scale and designated 29. These numerals may be read through the opening 27 and as illustrated there is a medially disposed zero mark and then a progressive series of numerals on each side of the zero mark. It will be obvious that when either one of the rims 19 is forced inward or toward the other opposite rim, or toward the frame 11, the members 25 and 26 will move relative to each other and the graduations or numerals 29 will indicate the extent of this movement. If the track is of standard gauge and there are no variations in the gauge, the zero mark will be indicated at all times through the opening 27 but if the track contracts or widens, the members 25 and 26 will shift inward or outward relative to each other and the numerals 29 will indicate the amount of this variation from gauge. The members 25 and 26 are slidingly supported in eyes 30 mounted upon uprights 31 carried by the frame bars 11 or otherwise connected thereto, so as to form a rigid supporting frame.

It is desirable to provide means whereby the machine may be entirely raised from the rails if necessary, or whereby the rail engaging annuli may be drawn inward against the action of the springs 22 when passing through a frog at switches. To this end I provide the conjoined cords 32 which extend divergently rearward and pass through eyes or pulleys 33 and are attached to the sleeves 21 at 34, these conjoined cords extending forward to an operator on the tractive vehicle. If the frame bars 11 are pivotally connected to the tractive vehicle, then a sufficient pull upon these cords will first draw the sleeves 17 towards each other together with the sleeves 21 against the action of springs 22, and will then lift the device off of the rails. When, however, the gauge indicating mechanism is about to pass through a frog, or switch points, it is necessary only to give sufficient pull upon the cords to retract the rail engaging annuli. It will be understood from the drawings that the frame upon which the indicator is mounted is approximately L-shaped in side elevation. In other words, the frame bars 11 extend horizontally forward and the frame bars 31 extend vertically upward from the rear end of the frame bars 11 so that an upward and forward pull upon the conjoined cords 32, assuming that the forward ends of the bars 11 are loosely or pivotally connected to a tractive vehicle, will act to lift the rear end of the indicator after having compressed the springs 22 and this will raise the rear end of the indicator off the track.

This railroad track gauge indicator may be operated at any reasonable speed and shows the distance between the rails at any speed. Each rim 19 should be beveled about one-fourth the distance from the outside of top edge to the inside edge at an inclination of about 20°. This will prevent the annulus from riding the rail. The remainder of the face of the annulus should be flat so as to engage flatly against the rail and to thus secure an exact indication of the distance between the rails.

The purpose of providing the extension 16 of the flange of the wheel 14 is to permit a wheel having a relatively small width to be used and at the same time secure sufficient movement of the sleeves 17 and the annular rim. These extensions 16 extend inward and toward the axle for the reason that often times there is dirt near the rails and the angularly bent extension will not pick up this dirt. The slots 15 formed in the flange of the wheel and in these extensions are closed at their inner ends by said extensions so that when the rim 19 has moved inward so far that the spokes will engage these extensions 16, the rim 19, which in some respects constitutes the flange of the wheel, will guide the machine in the same manner that the ordinary wheel flange would guide it. At this time, while one of the rims 19 is acting as a guide flange for the machine, the other rim will be free to indicate the gauge of the track and any variations from this gauge. This action is only necessary at switches or stiff curves. The bolts which connect the forward ends of the draft bars 11 to the motor car, hand car, or the like, should be sufficiently smaller than the holes through which they pass so that there can be sufficient play to permit this guidance. It will be seen that this device guides and gauges at the same time.

While I have illustrated certain details of construction and arrangement of parts I do not wish to be limited to the specific form illustrated as it is obvious that many changes might be made therein without departing from the spirit of the invention as defined in the appended claims.

I claim:—

1. A track gauge indicator comprising a frame and an axle on the frame, wheels mounted upon the axle and adapted to engage the rails of the track, annular gauging rims associated one with each wheel and concentric to the axis thereof, rotatable with the wheel but movable longitudinally of the axle independently of the wheel, and means mounted upon the frame for indicating the longitudinal movement of the rims relative to each other.

2. A railway track indicator comprising an axle, rail engaging wheels mounted thereon, a draft frame supported upon the axle, relatively movable sleeves mounted upon the axle, one inward of each wheel, the sleeves having radiating spokes and each wheel having an inwardly extending flange slotted to receive the spokes, a rim held by the spokes at each sleeve and disposed exteriorly of the wheel flange and adapted to bear against the inner face of a rail, springs urging said sleeves outward, and indicating means operatively connected to said sleeves and adapted to indicate the relative inward or outward movement of the rims.

3. A railway track indicator comprising an axle, rail engaging wheels mounted thereon, a draft frame supported upon the axle, relatively movable sleeves mounted upon the axle, one inward of each wheel, the sleeves having radiating spokes and each wheel having an inwardly extending flange slotted to receive the spokes, a rim carried by the spokes and disposed exteriorly of the wheel flange and adapted to bear against the inner face of a rail, springs urging said sleeves outward, and indicating means operatively connected to said sleeves and adapted to indicate the relative inward or outward movement of the rims and including sleeves mounted upon the axle and bearing against the first named sleeves, arms carried by said second named sleeves, and indicating members carried by the arms, one telescoping within the other, the smaller indicating member having graduations.

4. A railway track indicator comprising an axle, rail engaging wheels mounted thereon, a draft frame supported upon the axle, relatively movable sleeves mounted upon the axle, one inward of each wheel, each sleeve having radiating spokes and gauging the rim carried thereby and each wheel having an inwardly extending flange slotted to receive the spokes, each rim being disposed exteriorly of the wheel flange and adapted to bear against the inner face of a rail, springs urging said sleeves outward, and indicating means operatively connected to said sleeves and adapted to indicate the relative inward or outward movement of the rims and including sleeves mounted upon the axle and bearing against the first named sleeves, arms carried by said second named sleeves, and indicating members carried by the arms, one telescoping within the other, the smaller indicating member having graduations, and means whereby the second named sleeves may be manually retracted simultaneously against the action of said springs.

5. A railway track gauge indicator comprising an axle, a draft frame mounted thereon, wheels mounted upon the extremity of the axle, each wheel having an inwardly extending tread, the treads being longitudinally slotted at a plurality of points, and each tread having inward and centrally angled extensions into which said slots extend and closing the inner ends of the slots, a sleeve associated with each wheel and mounted upon the axle, each sleeve having spokes extending outward through said slots, the spokes carrying a beveled rim, sleeves mounted upon the axle inward of the first named sleeves and against which the first named sleeves abut, springs surrounding the axle and bearing against said frame and against the inner ends of the second named sleeves and urging said sleeves outward, uprights carried by the second named sleeves, and indicating members carried by the uprights, one telescoping within the other, the larger member having an opening and the smaller member having graduations observable through said opening.

In testimony whereof I hereunto affix my signature.

LESLIE RAY BRYANT.